Dec. 3, 1963  J. P. ANDERSON ETAL  3,112,764
FLOW-REGULATING VALVE
Filed Oct. 28, 1960
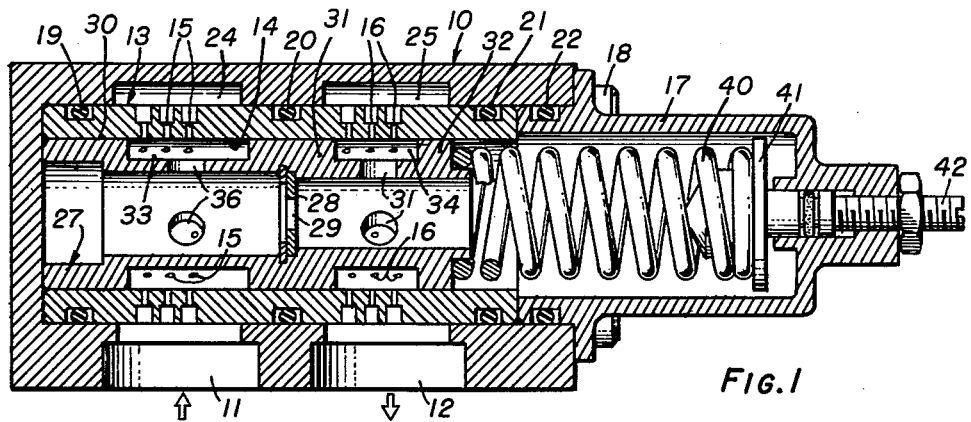
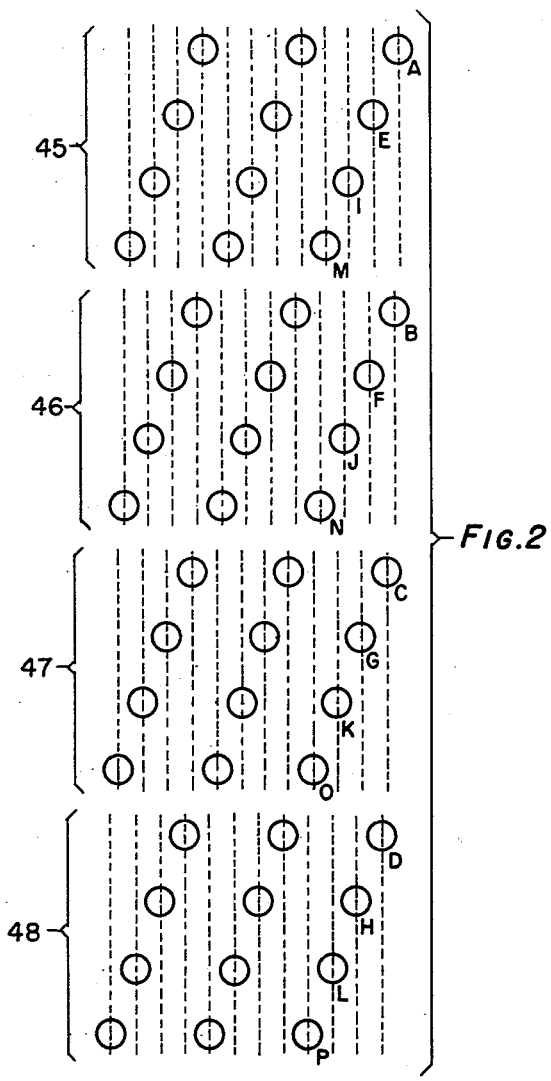

United States Patent Office 3,112,764
Patented Dec. 3, 1963

3,112,764
FLOW-REGULATING VALVE
John P. Anderson, Sepulveda, and Oliver E. Drummond, Los Angeles, Calif., assignors to The Bendix Corporation, North Hollywood, Calif., a corporation of Delaware
Filed Oct. 28, 1960, Ser. No. 65,827
3 Claims. (Cl. 137—594)

This invention relates to flow-regulating valves, sometimes referred to as flow-control valves or flow-limiting valves. The general purpose of such valves is to maintain fluid flow relatively constant despite varying pressures.

An object of the invention is to provide a valve that maintains flow more constant over a large range of pressures than previously known valves.

Another object is to reduce the pressure forces tending to stress the relatively movable valve parts and interfere with their desired operation.

Another object is to provide a valve of the type described that is simple and reliable.

Other more specific objects and features will appear from the description to follow.

A commonly used type of flow-regulating valve comprises, in essence, a fixed flow restrictor and a variable flow restrictor connected in series, and a pressure-responsive motor element subject to the pressure drop across the fixed restrictor for increasing the restrictive effect of the variable restrictor in response to an increase in the pressure drop across the fixed restrictor. The fixed restrictor is usually a single orifice, the variable restrictor is a shuttle valve having a land variably covering a port, the motor element is a piston or diaphragm having its opposite faces exposed to the pressures upstream and downstream of the orifice, respectively, and urged by a spring in direction opposing the resultant pressure force. An increase in flow through such a valve increases the pressure drop across the orifice which, acting against the spring force, causes the motor to move the shuttle valve in direction to close its port and limit the flow increase to something less than it would have been without the increased restriction offered by the shuttle valve.

The extent of control obtained with prior valves of the type described is dependent upon the extent to which the rate of the spring can be matched by flow forces on the land of the shuttle valve by the fluid flow past the land as it laps the port. A spring with a very low rate and a valve having very low flow forces can be designed to provide close control, but springs of the necessary stiffness and low rate are bulky and impracticable for most uses. When it is necessary to use springs having a substantial spring rate, flow forces have been used to compensate for the high spring rate. Unfortunately, although spring rate is inherently a constant (the spring force increasing linearly with deflection), the flow forces in a conventional slide valve vary irregularly with movement of the valve. For this reason, typical prior valves of this type known to me are able to maintain flow within only about ±10% of constancy over a pressure change of approximately 250 p.s.i.

In accordance with the present invention, flow has been maintained within less than ±1% of constancy over a pressure range of 500 p.s.i. to 2800 p.s.i. This is accomplished by the following main departures from the conventional construction described:

(1) The use of a large number of small holes instead of a single large hole as the port cooperating with the spool valve;

(2) The use of a plurality of valved ports in series as the variable restrictor;

(3) A simple construction incorporating the foregoing features.

A full explanation of the invention is given in the following detailed description with reference to the drawing, in which:

FIG. 1 is a longitudinal sectional view of one embodiment of the invention.

FIG. 2 is a diagram showing a preferred pattern or arrangement of the multiple holes of the valve ports in the valve of FIG. 1.

A practical embodiment of the invention is shown in FIG. 1. It comprises a body member 10 having an inlet connection 11 and an outlet connection 12. The body 10 is generally tubular and contains a liner 13, the inner surface 14 of which constitutes a valve cylinder having an inlet port consisting of a zone of small circular holes 15 and an outlet port consisting of a zone of small circular holes 16. Liner 13 is retained in place by a spring housing 17 secured to the right end of the body 10 as by screws 18. The body 10 is sealed with respect to the liner 13 and the spring housing 17 by annular seals 19, 20, 21 and 22. The outer ends of the holes 15 are communicated with the inlet connection 11 by an annular recess 24 in the inner surface of the body, and the holes 16 are similarly communicated with the outlet connection 12 by an annular recess 25.

Slidably positioned within the valve cylinder 14 is a shuttle valve 27 which is hollow and open at both ends and has intermediate its ends an orifice plate 28 defining a fixed flow restrictor orifice 29. Lands 30, 31 and 32 on the valve 27 define an annular recess 33 which is normally juxtaposed to the holes 15 and an annular recess 34 which is normally juxtaposed to the holes 16. The annular recess 33 is communicated with the interior of the valve 27 on the upstream side of the orifice 29 by holes 36, and the recess 34 is similarly communicated with the interior of the valve on the downstream side of the orifice 29 by holes 37. The valve 27 is urged to the left by a helical compression spring 40 compressed between the right end of the valve and a retainer 41 adjustably supported near the right end of the spring housing 17 by a screw 42 extending through the right end of the spring housing.

Under conditions of low flow the valve 27 is retained in its left end position, as shown, in which the holes 15 and 16 are substantially completely uncovered by the lands 30 and 31 respectively of the valve, so that relatively free flow can occur from the inlet connection 11 to the orifice 29, and from the orifice 29 to the outlet connection 12. Fluid flow through the valve develops a pressure drop across the orifice 29, creating a differential pressure between the two ends of the valve 27 opposing the force of the spring 40.

As the pressure between the inlet and outlet connections 11 and 12 is increased, the flow increases therewith until it reaches the rated flow of the valve, at which time the pressure differential created by the orifice 29 is sufficient to overcome the force of the spring 40, the valve 27 moves to the right, and the land 30 and the land 31 begin to simultaneously cover the holes 15 and 16 respectively, to thereby increasingly throttle fluid flow through the valve. The total forces applied to the valve 27 cause it to assume a position with respect to the holes 15 and 16 such as to increase the total throttling effect of the valve substantially in proportion to the increase in total pressure between the inlet connection 11 and the outlet connection 12, so that the flow remains virtually constant over a wide range of pressures.

The total force affecting movement of the valve 27 between open and closed positions is mainly the resultant of the following components:

(1) The opening force of the spring 40;

(2) The closing force of the pressure differential across orifice 29;

(3) The closing flow forces on the right ends of lands 30 and 31 of fluid passing through holes 15 and 16 that are lapped (partially covered) by the lands 30 and 31;

(4) Frictional forces between the valve 27 and sleeve 13 which impede movement of the valve in either direction.

The opening force of the spring 40 is determined by its stiffness, the extent to which it is compressed, and its spring rate which causes the spring force to increase linearly as the valve 27 moves from open to closed position.

The closing force of the pressure differential across orifice 29 is substantially linearly proportional to the square of the rate of flow through the orifice. Therefore, if there were no other forces involved than the spring force and the differential pressure force across orifice 29, and the pressure drops across the holes 15 and 16, the rate of fluid flow through the valve would increase proportional to the spring rate in response to increasing pressure between the inlet and outlet connections 11 and 12, respectively.

The closing flow forces acting on the right ends of lands 30 and 31 are negative and therefore aid the pressure differential across orifice 29 in opposing spring 40. As the pressure across the valve increases, and the valve 27 moves to the right to increasingly compress the spring 40, the total area of the holes 15 and 16 is increasingly throttled by the lands 30 and 31 to increase the pressure drop across the holes and increase the velocity of flow through those holes not completely covered by the lands. The increase of velocity through the lapped holes increases the flow forces on the right ends of the lands 30 and 31 and compensates, to a very large extent, for the increase in the spring force resulting from the spring rate.

The valve differs importantly from prior known valves of the same general type in the following respects:

(1) The use of the plurality of holes 15 or 16 instead of a single large port;

(2) The use of the two throttling ports in series represented by the holes 15 and land 30 and the holes 16 and the land 31, respectively, instead of a single throttling port.

The use of the plurality of the holes 15 or 16 instead of a single large port has the important advantage that the flow forces opposing the spring force vary more linearly over the range of movement of the valve. With a single large port, the entire port is being lapped by the edge of the land between fully open and fully closed positions, so that the cross-sectional shape of the entire flow path is continually changing. On the other hand, with the plurality of holes 15 or 16 only a fraction of the holes are being lapped at any one time by the land, and only the cross-sectional flow area of these lapped holes is changing. The holes that have been completely covered by the land are inactive and therefore can produce no flow forces. The flow through holes that are not lapped by the valve is not affected by the land, and for that reason produces no axial flow forces thereon. Because the overall shape of the aggregate flow passage through the multiplicity of holes is affected to a relatively small degree as the valve moves through the major portion of its range, the increase in flow forces on the land more nearly approximates the spring rate. The velocity through all the holes that are not completely covered increases as the valve moves to the right in response to increased pressure, and the increased velocity through those holes that are being lapped increases the flow forces on the land to compensate for the increased force of the spring 40 due to its spring rate.

The use of the two throttling ports in series has the important advantage over a single throttling port that the pressure drop across each one of the two throttling ports is only half of what it would be with a single port. This reduced pressure drop is desirable because it reduces the distortion of the valve parts resulting from pressure.

Another advantage of two throttling ports in series over a single throttling port results when the ports each consist of a plurality of holes. The advantage is that for a given size of holes, the pressure range of accurate control can be extended, for the following reason:

As will be explained later with reference to FIG. 2, when the holes are displaced axially less than the hole diameter, several holes are being lapped by a land simultaneously during most of the movement of the valve, and the flow-restricting effect varies linearly with movement. In addition, the flow forces developed are only those of fluid flowing through the lapped holes, and they are proportional to the pressure drop across the holes, but are essentially independent of the total flow rate through all the uncovered holes.

However, near the high point of the pressure range of the valve, when the last hole in a port is being lapped, the flow forces are not independent of the total flow rate, and the restrictive effect no longer varies linearly with the valve movement.

Furthermore, the maximum pressure drop at which the valve can accurately control the flow is determined by the maximum resrtiction obtainable while still permitting normal flow; hence, the maximum restriction should not require the last hole of any group of holes to be lapped.

In other words, the choice of the size and number of holes to obtain a desired rate of change of restriction with valve displacement, and a desired rate of change of flow force with pressure drop, is limited by the requirement that the last hole must not be lapped, and its area determines the maximum pressure at which the flow can be accurately controlled. The smaller this hole, the higher is this maximum pressure. There are practical limits as to how small the holes can be.

When the variable restrictor comprises two sets of holes in series, the pressure drop across each hole need be only half what it would have to be with only one set of holes, and the holes can be larger. Conversely, for holes of a minimum practical size, the use of two sets of holes in series extends the pressure range over which flow is accurately controlled to higher pressures than could be obtained with a single set of holes.

It is to be noted that although only two variable flow restrictors are incorporated in the valve of FIG. 1, the invention is not limited to this number. Greater functional advantage may in some instances be obtained with more than two, but the valve structure would be more complicated and expensive.

It is also immaterial to the functioning of the valve whether the variable restrictors are positioned upstream or downstream with respect to the fixed orifice so long as the design is such that only the pressure drop across the fixed orifice is effective to activate the variable restrictors.

Each of the holes 15 or 16 is axially spaced relative to the others so that they are sequentially covered by the land 30 or 31 in response to equal increments of movement. The pattern of the holes is also preferably such that axially adjacent holes are substantially spaced circumferentially from each other so that axial flow forces on the land ends produced by fluid flowing through lapped holes and pressure forces on the peripheral faces of the lands at blocked or lapped holes are distributed circumferentially and do not tend to cock the valve and thereby increase its frictional resistance to movement.

A suitable pattern is shown in FIG. 2 in which the holes are arranged in sixteen axially extending rows, three holes equally axially spaced in each row. The holes are arranged in four circumferentially arranged groups 45, 46, 47, 48. The hole patterns within the groups are identical, but the groups are axially displaced from each other one-fourth of the axial displacement of the rows within each group. The result is that the holes successively lapped occur in successive groups 45, 46, 47, 48, 45, 46, 47, etc., which are successively displaced 90° about the axis of the valve. The holes successively lapped in response to leftward (opening) movement of the valve are partially indicated by the reference letters A to P in alphabetical order.

For a given pressure drop, the flow forces of fluid flowing through a lapped hole 15 or 16 increase as the valve land moves from one edge of the hole to substantially the center and decrease as the land continues its movement to the opposite edge, but the total flow forces of a large number of holes can be made substantially constant during valve movement by proper axial spacing of the holes relative to each other so that they overlap. It is known that if successively lapped holes overlap each other approximately 18% of the diameter of the holes, the variations in the flow forces of the individual holes are largely compensated for. In FIG. 2, successive holes in each group, such as holes A and E in group 45, are positioned to overlap 18% of the diameter, which corresponds to a center-to-center displacement of 82% of the diameter. Therefore, within each group the variations in flow forces of the individual holes are largely compensated. The lesser displacement (¼ of that within the groups) of 20½% of the diameter between the groups tends to average out the small variations in the rate of change of the flow restriction and the flow forces in response to valve movement within each group, which variation would occur simultaneously in all the groups if they were not staggered with respect each other.

It has been previously indicated that the use of a plurality of variable restrictors in series reduces the forces tending to distort the valve structure. In FIG. 1 these forces are the radial forces on the liner 13 resulting from the pressure drops in the holes 15 and 16. In the case of holes 15 the force is inward, tending to distort the liner into binding engagement with the lands of valve 27. In the case of holes 16, the force is outward, tending to increase leakage between the liner 13 and the lands of valve 27.

Although for the purpose of explaining the invention a particular embodiment thereof has been shown and described, obvious modifications will occur to a person skilled in the art, and we do not desire to be limited to the exact details shown and described.

We claim:
1. A variable flow restrictor comprising:
a slide valve having a sleeve member having a port therein and a land member relatively movable to cover and uncover said port and variably block fluid flow therethrough;
said port consisting of a plurality of small holes arranged in identical groups symmetrically distributed circumferentially about said sleeve member, the holes in each group being uniformly displaced axially with respect to each other a first fixed distance less than their diameter, and the groups being displaced axially with respect to each other a second fixed distance less than said first fixed distance, the circumferential spacing of said groups and the axial dimensions of said holes being sufficiently large relative to the axial spacing between said groups to cause simultaneous lapping by said land member of holes in different groups symmetrically distributed circumferentially about said sleeve member.

2. A flow-regulating valve comprising:
means defining inlet and outlet connections and a fluid passage including a fixed flow restrictor and a variable flow restrictor in series relation between said inlet and outlet ports;
means for varying said variable flow restrictor in response to vadiations in pressure across said fixed flow restrictor, such that an increase in said pressure increases the flow resistance of said variable restrictor, and vice versa;
said variable flow restrictor comprising slide valve means having two relatively slidable tubular members, one having a port therein and the other having a blocking surface movable to cover and uncover said port;
said port consisting of a plurality of identical groups of small openings, the groups being distributed symmetrically about said one member, the openings in each group being uniformly displaced axially with respect to each other a first fixed distance, and the groups being uniformly axially displaced with respect to each other a second fixed distance less than said first fixed distance, the circumferential spacing of said groups and the axial dimensions of said openings being sufficiently large relative to the axial spacing between said groups to cause simultaneous lapping by said blocking surface of openings in different groups symmetrically distributed circumferentially about said tubular members, whereby openings successively lapped by said blocking surface are in different groups substantially spaced circumferentially from each other, and radial forces caused by flow at lapped openings are substantially spaced circumferentially.

3. Apparatus according to claim 2 in which said second fixed distance of axial spacing between said groups of openings is approximately 18% of the diameter of the openings, and said first fixed distance of the axial spacing between the holes within each group is approximately the product of said second fixed distance and the number of said groups.

References Cited in the file of this patent
UNITED STATES PATENTS

| | | |
|---|---|---|
| 853,693 | Healey | May 14, 1907 |
| 2,755,815 | Erle | July 24, 1956 |
| 2,737,196 | Eames | Mar. 6, 1956 |
| 2,800,141 | Hedlund | July 23, 1957 |
| 2,833,362 | Martin | May 6, 1958 |
| 2,950,733 | Perkins | Aug. 30, 1960 |
| 2,970,609 | Beremand | Feb. 7, 1961 |
| 3,015,341 | Hedland et al. | Jan. 2, 1962 |

FOREIGN PATENTS

| | | |
|---|---|---|
| 13,595 | Great Britain | of 1903 |